No. 856,511. PATENTED JUNE 11, 1907.
G. H. BOWEN.
SIGNALING SYSTEM.
APPLICATION FILED DEC. 26, 1905.

5 SHEETS—SHEET 1.

No. 856,511. PATENTED JUNE 11, 1907.
G. H. BOWEN.
SIGNALING SYSTEM.
APPLICATION FILED DEC. 26, 1905.

5 SHEETS—SHEET 2.

Witnesses.
C. H. Garnett
J. Murphy

Inventor:
George H. Bowen
by Jas. H. Churchill
Atty.

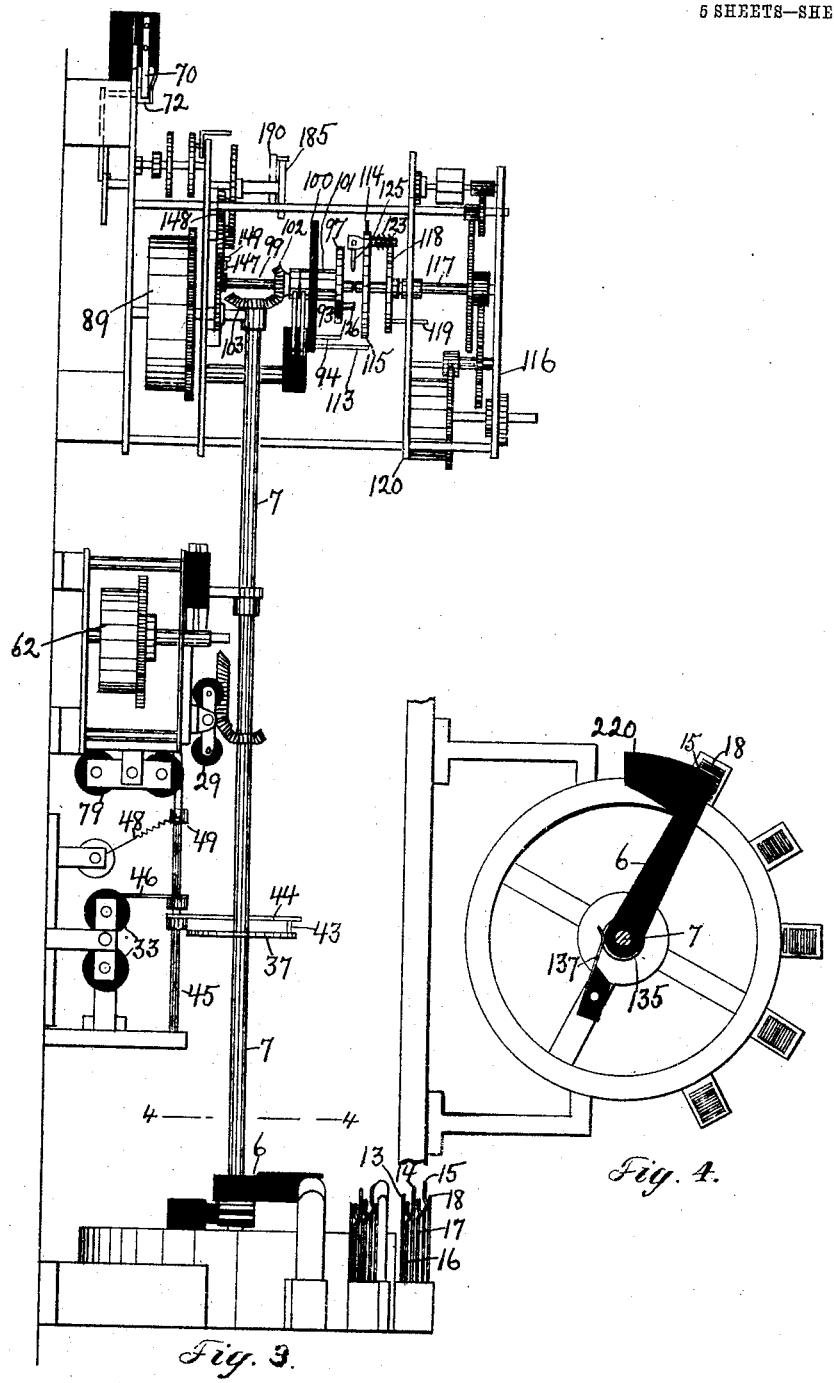

No. 856,511. PATENTED JUNE 11, 1907.
G. H. BOWEN.
SIGNALING SYSTEM.
APPLICATION FILED DEC. 26, 1905.
5 SHEETS—SHEET 4.
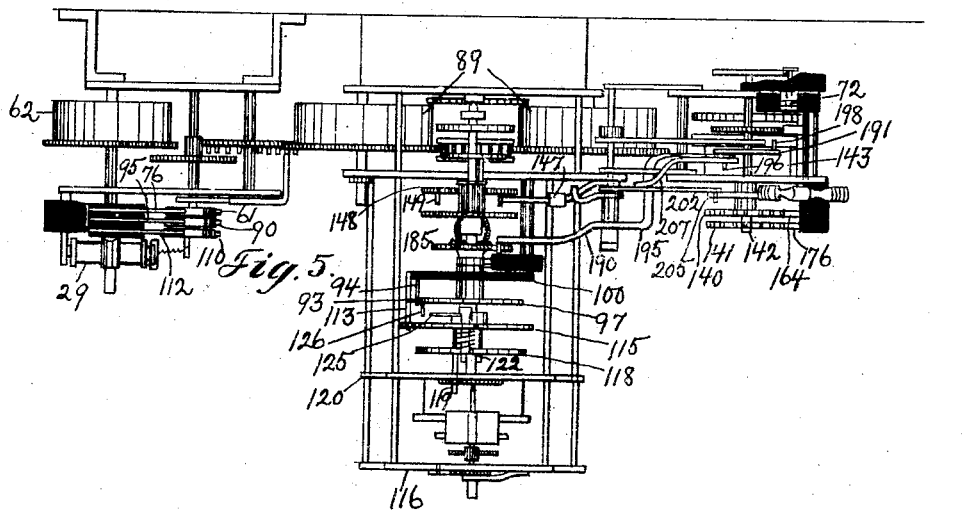
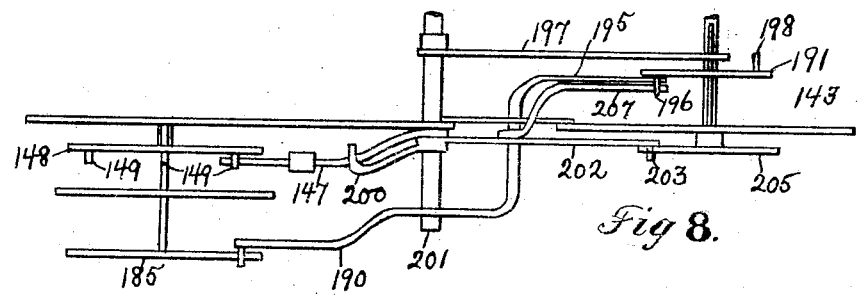
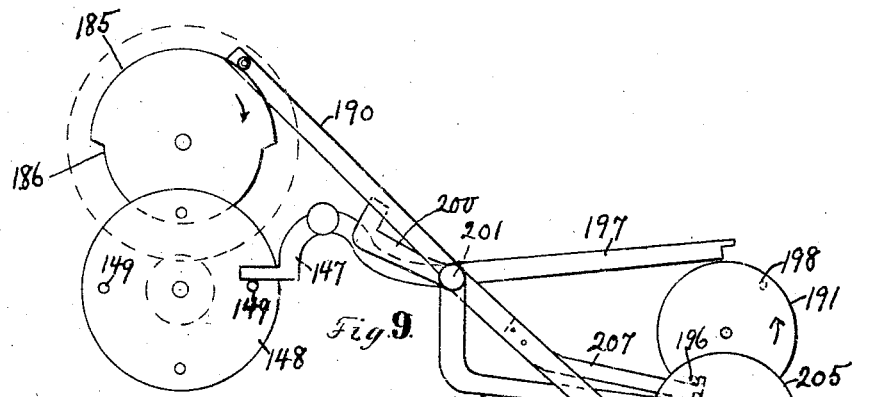

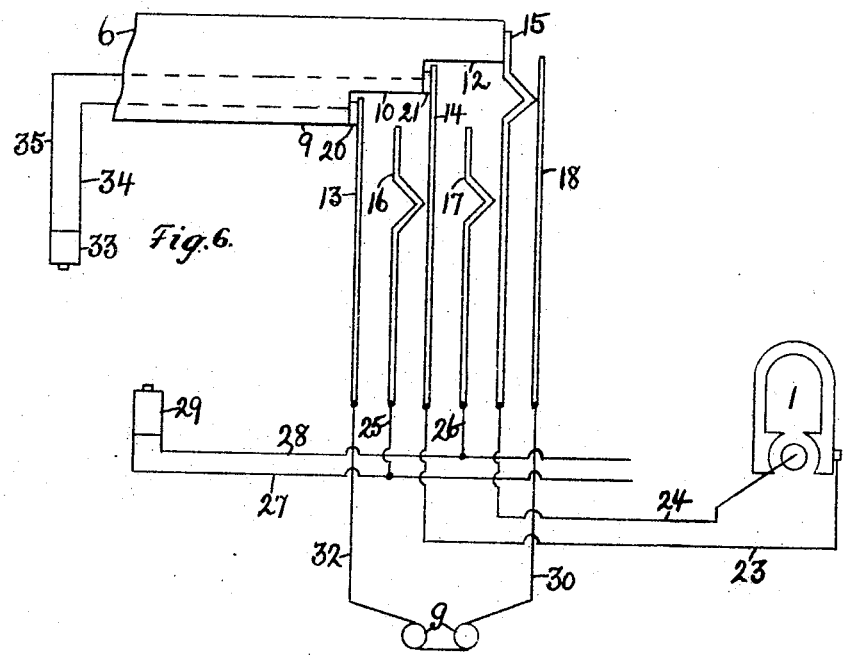
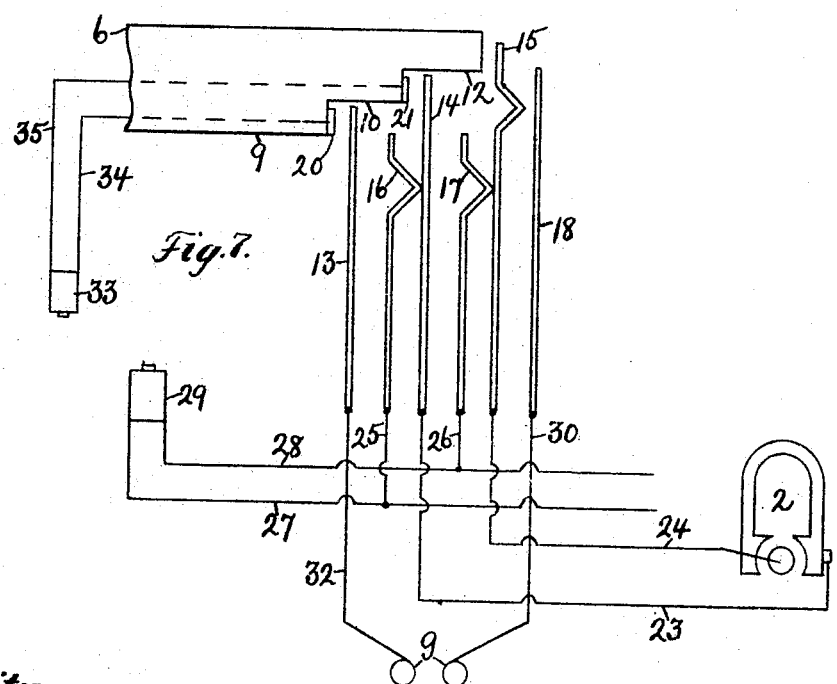

UNITED STATES PATENT OFFICE.

GEORGE H. BOWEN, OF BOSTON, MASSACHUSETTS, ASSIGNOR TO BOSTON AUTOMATIC FIRE ALARM COMPANY, OF BOSTON, MASSACHUSETTS, A CORPORATION OF MAINE.

SIGNALING SYSTEM.

No. 856,511.    Specification of Letters Patent.    Patented June 11, 1907.

Application filed December 26, 1905. Serial No. 293,187.

*To all whom it may concern:*

Be it known that I, GEORGE H. BOWEN, a citizen of the United States, residing in Boston, in the county of Suffolk and State of Massachusetts, have invented an Improvement in Signaling Systems, of which the following description, in connection with the accompanying drawings, is a specification, like letters on the drawings representing like parts.

This invention relates to a signaling system especially designed and adapted to be employed with or embodied in a watchman's time recording system, wherein a series of sub-stations such as individual buildings are connected with a central office.

The present invention has for its object to provide a system of the class described, wherein faults or defects in the apparatus employed in the system may be made known at the central office, and wherein failure of the watchman to properly perform his duty may also be made known at the central station.

These and other features of this invention will be pointed out in the claim at the end of this specification.

Figure 1:
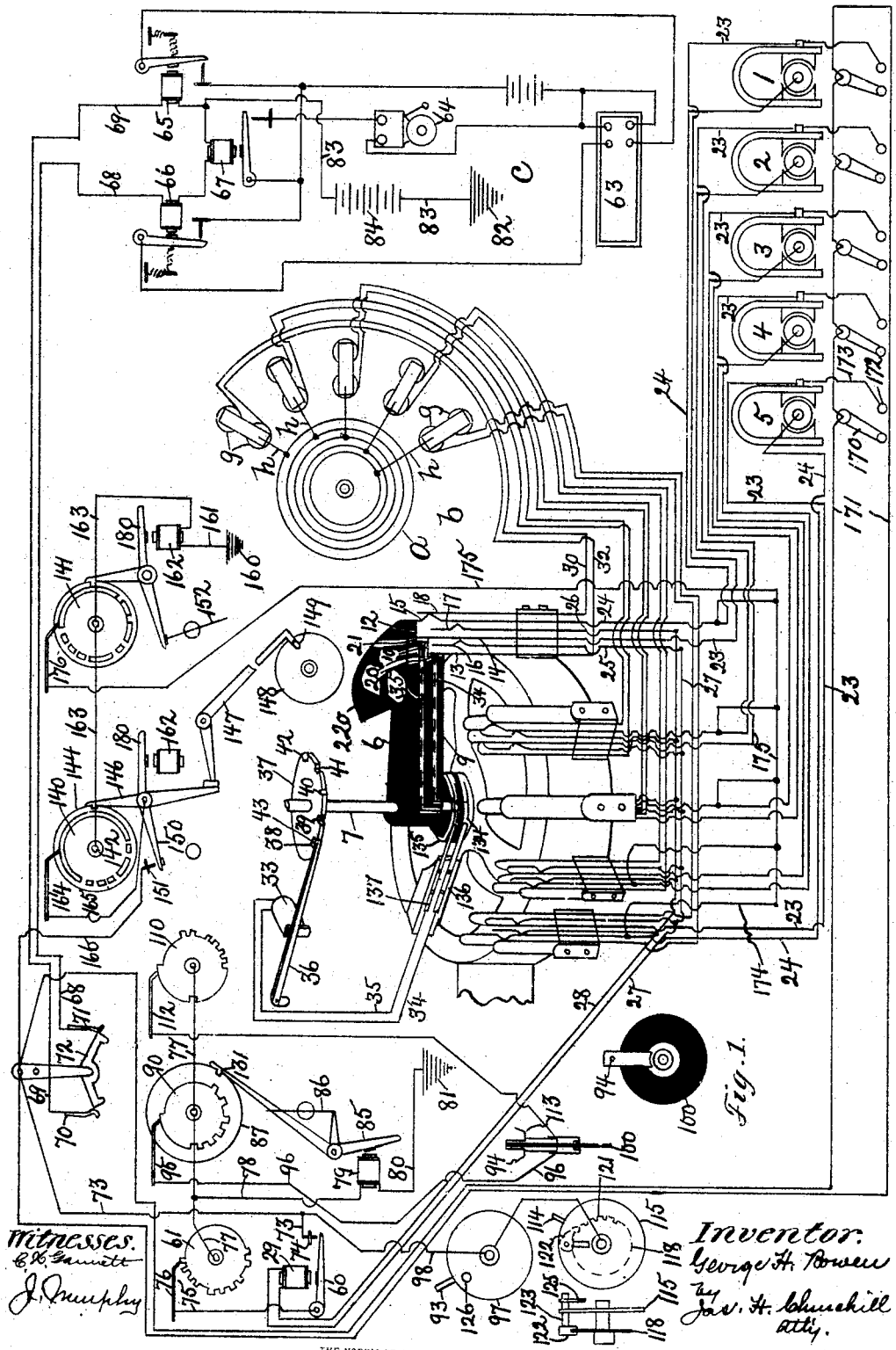
Figure 2:
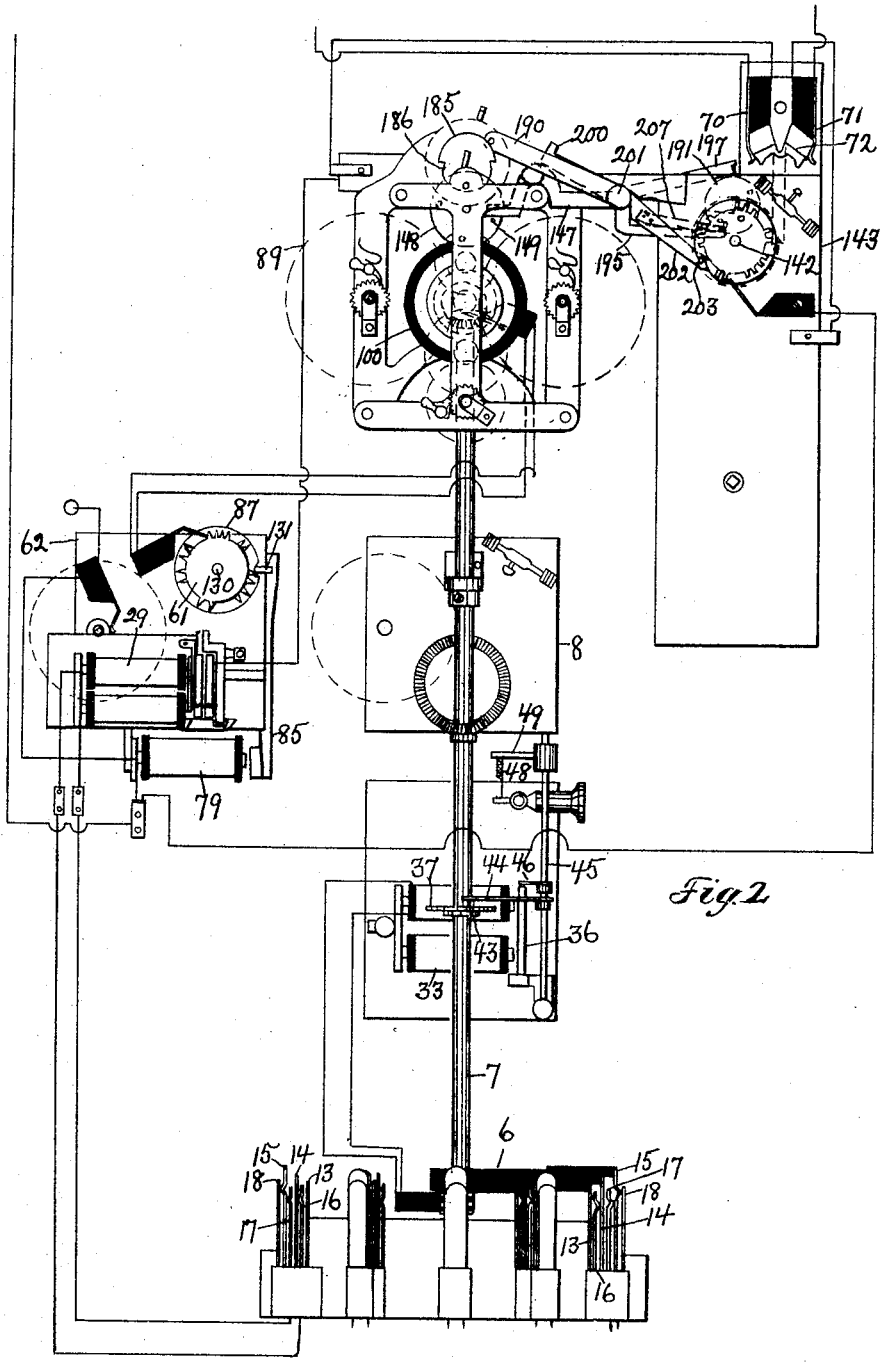

Figure 1 is a diagrammatic view of a signaling system embodying this invention. Fig. 2, a diagrammatic view of parts of the system shown in Fig. 1. Fig. 3, a side elevation of the apparatus shown in Fig. 2, looking toward the right. Fig. 4, a detail to be referred to. Fig. 5, a plan view of the apparatus shown in Fig. 2. Figs. 6 and 7, details in diagram to be referred to, and Figs. 8 and 9, details to be referred to.

Referring to the drawings, $a$ represents the recording clock of a watchman's recording system, which may be of any suitable or usual construction and is located in a building $b$, having distributed over it a plurality of transmitting devices designed to be operated in predetermined order or sequence by the watchman. The transmitting devices referred to may be push buttons or other forms of circuit controllers or they may be magneto generators as herein shown and marked 1, 2, 3, 4 and 5. Each magneto constitutes a signal transmitter within the building $b$, and the latter constitutes a sub-station for a general system including other sub-stations or buildings and a central office $c$, which is connected in circuit with all the sub-stations or buildings.

The present invention has for one of its objects to provide means for indicating at the central office $c$ the condition of the system and apparatus in the sub-stations or buildings connected with the central office. For this purpose, provision is made for transmitting to the central office various signals, such for instance as a signal to indicate that the watchman is not performing his duty; a signal that the apparatus is out of order, and a signal that the system is in proper working condition. For the purpose of checking the watchman, I employ a circuit controlling device which is operated by a motor, which in turn is controlled by the transmitting devices located in the building or substation and operated by the watchman. The circuit controlling device referred to also governs the circuits of the magnets $g$, which operate the recording pens or styluses $h$ of the watchman's recording clock and which constitute the receiving instruments for the transmitters.

In the present instance, I have shown one form of circuit controlling device, which consists of an arm 6 of insulating material fast on a shaft 7 which is rotated by the motor train or movement 8 (see Fig. 2). The arm 6 is provided as herein shown with three steps or fingers 9, 10, 12 (see Figs. 1, 6 and 7), which co-operate with three circuit terminals or contact arms 13, 14, 15; the arms 14, 15 in turn co-operating with three circuit terminals or contact arms 16, 17, 18. The fingers 9, 10 on the arm 6 may have secured to them contact plates or pieces 20, 21, which are adapted to engage the circuit terminals 13, 14 for a purpose as will be described. It will be understood, that the circuit controlling arm 6 co-operates with a group of circuit terminals or contact arms for each of the transmitting devices 1 to 5 inclusive, which are located in the sub-station or building $b$. The transmitting devices 1 to 5 inclusive represent five different transmitting stations located on different floors of the building, or located otherwise, and which are designed to be visited by the watchman in sequence and at predetermined intervals, so as to effect a record on the recording clock $a$, which is usually located in the office of the building.

Inasmuch as the operation of the system is the same for each transmitting station, it is deemed sufficient to explain in detail the operation from one transmitting station, as, for instance, the station 1.

Referring to Fig. 6, the generator 1 is connected by wires 23, 24 to the contact arms or terminals 14, 15, which latter normally engage the terminals or contact arms 16, 17, as shown in Fig. 7 and which are joined by wires 25, 26 to the wires 27, 28 including an electromagnet 29, which may be termed the trouble magnet. The circuit terminal or contact arm 15 is normally out of contact with the terminal 18 which has connected with it one wire 30 of the electromagnet $g$ of the recording clock, the said magnet having its other wire 32 connected with the terminal or contact member 13.

By reference to Fig. 7, it will be seen that when the circuit controlling arm 6 is not engaged with the circuit terminals 13, 14, 15, the circuit of the pen magnet $g$ is open between the terminals 15, 18, and also between the terminal 13 and the contact plate 20, while the circuit of the trouble magnet 29 is closed at the terminals 14, 16, 15, 17. The circuit controlling arm 6 is designed to be moved step by step at proper or predetermined intervals, by the watchman operating one of the transmitting devices. This result may be accomplished as herein shown by placing the movement of the circuit controlling arm 6 under the control of an electromagnet 33, which is connected by the wires 34, 35, with the contact plates 20, 21. For convenience in construction, the connections between the contacts 20, 21, which are represented as wires 34, 35 in Figs. 6 and 7, are shown in Fig. 1 as including two collector rings 134, 135 and their co-operating brushes 136, 137. The electromagnet 33 has its armature 36 operatively connected with a disk 37 fast on the shaft 7 and provided with notches or teeth in its periphery, one for each transmitting station or device and herein shown as five in number, which are marked 38, 39, 40, 41, 42 (see Fig. 1) and with which co-operates a locking tooth or projection 43, which is shown conventionally in Fig. 1 as attached to the armature 36 and which is shown in Fig. 2 as depending from an arm 44 secured to a rock-shaft 45, having an arm 46 connected with the armature 36. The locking tooth or projection 43 is held in engagement with a notch in the disk 37 by a spring 48 connected with an arm 49 on the rock-shaft 45. The electromagnet 33 is energized by the watchman operating one of the transmitting devices 1 to 5 inclusive at the proper time. As represented in Figs. 1 and 6, the circuit controlling arm 6 is supposed to be in proper position to enable the receiver or recording magnet $g$ corresponding to transmitting station 1 to be energized and effect a record if station 1 is operated by the watchman at the proper time. Assume that the apparatus is in proper order for the watchman to operate the magnet $g$ for station 1. In this case, operation of the transmitter or generator 1, sends a current through the magnet $g$ and also through the magnet 33.

The circuit of the magnet $g$ may be traced in Fig. 6 as follows:—From the generator 1 by wire 24 to terminal 15, thence by terminal 18 and wire 30 to magnet $g$, thence by wire 32, terminal 13, contact plate 20, wire 34, magnet 33, wire 35, contact plate 21, terminal 14 and wire 23 back to generator 1. The magnet $g$ attracts its armature and effects a record on the clock $a$, and the magnet 33 attracts its armature and releases the shaft 7, which is then rotated by its motor 8 until the circuit controlling arm 6 has been moved out of engagement with the circuit terminals 13, 14, 15 corresponding to transmitting station 1, and has been engaged with like terminals corresponding to transmitting station 2, and as soon as the controlling-arm 6 has passed out of engagement with the terminals corresponding to transmitting station 1, the circuits for the magnets $g$, 33 are opened, and the armature 36 is placed under the control of its spring 48, which causes the tooth 43 to engage the notch 39 in the disk 37, when the said notch is moved into line with said projection. In this manner the circuit controlling arm 6 is placed in operative condition or position with relation to the terminals corresponding to transmitting station 2, and if the watchman operates the transmitter 2 at the proper time and sequence, the receiver or magnet $g$ for station 2 will be energized and the circuit controlling arm 6 advanced to the terminals corresponding to station 3 and so on. It is desirable to provide for notifying the central office of any neglect, failure or omission on the part of the watchman.

To safeguard the system against neglect on the part of the watchman to operate the transmitters in sequence, the electromagnet 29 is provided. Assume that the circuit-controlling arm 6 is in the position represented in Figs. 1 and 6 and that the watchman neglects to operate transmitter 1 but instead operates transmitter 2. In this case, the circuit terminals corresponding to transmitting station 2 are in the position or condition represented in Fig. 7, and when the watchman operates the transmitter 2, current will be transmitted through the trouble magnet 29, the circuit of which may be traced as follows in Fig. 7. From the generator 2 by wire 24, terminals 15, 17, wires 26, 28, magnet 29, wires 27, 25, terminals 16, 14 and wire 23 back to generator 2. It will be noticed that the magnet $q$ for station 2 is not energized as its circuit is open between the terminals 15, 18. The trouble magnet 29 is thus energized, and attracts its armature 60 (see Fig. 1), thereby closing a circuit leading from the sub-station or building $b$ to the central office $c$ and including a signal transmitting apparatus, which is herein shown as a break wheel 61 which is operated by a motor or train 62 (see Figs. 2 and 5). The signal transmitted by the break wheel 61 is received in the central office $c$ upon a register 63 of any suitable or usual construction and a bell 64, both of which are in local circuits, the register being in a local circuit controlled by the relays 65, 66 and the bell being in a local circuit controlled by the relay 67. The electromagnets or relays 66, 67 are included in one side or line wire 68 of the line circuit, and the relay 65 is included in the other side or wire 69 of the line circuit. Within the building or substation $b$, the line wire 69 is connected to a terminal 70 and the line wire 68 to a terminal 71, with which co-operates a switch or circuit controller having a contact piece 72 normally engaged with both of said terminals, and adapted to be oscillated so as to be alternately disengaged from said terminals for a purpose as will be described. The contact piece or member 72 is connected by wire 73 with the front stop 74 for the armature 60 of the trouble magnet 29, and the said armature is connected by wire 75 with the contact pen 76 which co-operates with the break wheel 61, which is connected by wires 77, 78 with an electromagnet 79, which is connected by wire 80 to the ground 81, for a purpose as will be described. The line wires 68, 69 within the central office are also connected to the ground 82 by the wire 83 which includes a battery 84.

From the above description, it will be seen, that the energizing of the trouble magnet 29 completes the line circuit including the signal wheel 61 and the starting magnet 79 for the motor 62 which drives the signal wheel 61, the armature 85 of the magnet 79 co-operating with a fan or escapement 86 and with a detent disk 87 of said motor.

As soon as the motor 62 is released by the attraction of the armature 85 of the starting magnet 79, the signal wheel 61 is revolved and a signal characteristic or indicative of the fact that the watchman is operating the transmitting devices out of their proper order or sequence, is recorded in the central office and the attention of the central office operator is called to this fact by the sounding of the bell or audible signal 64. The circuit for the signal 61 may be traced as follows. From one pole of the battery 84 by wire 83 to ground 82 in the central station, thence from ground 81 in the substation $b$, by wire 80, magnet 79, wires 78, 77, break wheel 61, pen 76, wire 75, armature 60, front stop 74, wire 73, to contact piece 72, thence first over the line wire 69, and then over the line wire 68, through the relays 65, 66, 67, wire 83 to the other pole of battery 84. The local circuits containing the register 63 and bell 64 are thus closed and the signal received and recorded.

The signal transmitted by the break wheel 61, may be designated the wrong box signal, inasmuch as it is sent to the central office when the watchman operates the wrong transmitting device or station. Provision is also made for transmitting to the central office other signals, such for instance as those indicative of failure on the part of the watchman to transmit his signal, and failure on the part of a time train or clock motor 89 to operate.

A signal indicative of the failure of the watchman to perform his duty, is transmitted to the central office by a break wheel 90, which is provided with teeth distinguishable from the signal wheel 61. The signal wheel 90 is driven by the motor 62 (see Figs. 2 and 5), which is released by energizing the magnet 79, and the circuit of the magnet 79 is completed by engagement of a contact point 93 with a terminal 94.

The contact point 93 is engaged with the terminal 94 by the failure of the shaft 7 of the circuit controlling arm 6 to be advanced by its motor 8, the disk 97 being fast on the shaft 99 of the time movement 89, and the disk 100, which is of insulating material and carries the terminal 94, being fast on a hub or sleeve 101 loose on the shaft 99 and provided with a bevel pinion 102 which meshes with a bevel gear 103 fast on the shaft 7. The circuit controlling disk 97 is in continuous motion, while the time movement 89 is running, and the insulating disk 100 is moved step by step in unison with the arm 6 by the motor 8, and these movements are so timed, that under normal conditions, the contact arm 93 does not overtake the intermittently moving terminal 94, but in case the watchman fails to perform his duty or the circuits including the watchman's transmitting stations should become broken, the motor 8 stops, thereby stopping the disk 100.

When the disk 100 stops, the terminal 94 is overtaken by the continuously moving contact point 93, and the circuit of the break wheel 90 is completed through the starting magnet 79, thereby transmitting to the central station a signal which indicates at the central office, that the watchman is not performing his duty or else the wiring of the building is defective. The circuit of the signal wheel 90 may be traced in Fig. 1, as follows—From one pole of the battery 84 by wire 83 to ground 82, thence by ground 81, wire 80, magnet 79, wires 78, 77, break wheel 90, pen 95 co-operating with said wheel, and wire 96 to terminal 94, thence by contact point 93, disk 97, wires 98, 73 to contact member 72 and thence alternately over the line wires 68, 69, to the central office, through the relays 66, 67, 65 to battery 84.

A signal indicative of the fact that the time movement 89 has stopped while the watchman is performing his duty, is transmitted by a break wheel 110 co-operating with the pen 112 and controlled by a circuit controller, one member of which is a second terminal 113 on the disk 100, and the other member of which is a pin 114 on the periphery of a disk 115.

The disk 115 is operated by an auxiliary motor 116 (see Fig. 3) having its shaft 117 on which said disk is mounted arranged in line with the shaft 99 of the time movement 89. The auxiliary motor 116 is restrained from turning the disk 115 by a stationary disk 118 loose on the shaft 117 and having a stud or pin 119 engaging the frame 120 of the auxiliary motor.

The holding disk 118 is provided with teeth or notches 121 on its periphery, one for each transmitting station 1, 2, 3, etc., with which co-operates a holding pawl 122 on a rock-shaft 123 extended through the disk 115 and provided on the opposite side of said disk with a crank 125 which is adapted to be engaged by a trip stud or pin 126 projecting from the disk 97.

Under normal conditions, the trip stud 126 engages the crank 125 and releases the pawl 122 at the proper time and corresponding to the visits of the watchman to his transmitting stations, with the result that the disk 115 is moved step by step in unison with the disk 100 and consequently the circuit of the signal wheel 110 is not closed, as the terminal 113 does not engage the contact pin 114. If, however, the time movement 89 should stop, the circuit of the break wheel 110 will be closed by the engagement of the pin 113 with the pin 114, for it will be seen that if the clock or time movement 89 should stop, the disk 97 is stopped, and therefore the pin 126 does not trip the pawl 122, and the disk 115 remains stationary. On the other hand, the disk 100 is advanced by the watchman performing his duty, and the pin 113 is brought into engagement with the pin 114 on the now stationary disk 115, thereby closing the circuit of the signal wheel 110, and sending to the central office a signal indicative of the fact that the clock or time movement has stopped but that the watchman is performing his duty.

The signal wheels 61, 90 and 110 may be fast on the same shaft 130 of the motor 62 having its detent disk 87 engaged by a tooth or projection 131 on the armature 85 of the magnet 79. It will thus be seen, that the starting magnet 79 for the transmitting mechanism, which sends the fault signals to the central office is under the control of three independent circuit controllers. One of these circuit controllers comprises the armature 60 of the trouble magnet 29 and the front stop 74 for said armature, and this circuit controller is responsive to irregular work on the part of the watchman, and may be designated the wrong box signal controller. A second circuit controller comprises the members 93, 94 and becomes active upon the failure of the watchman to perform his duty or upon a defect in the wiring of the system in the sub-station. This circuit controller may be designated the watchman's fault controller. The third circuit controller comprises the members 114, 113, and becomes active upon failure of the time movement 89, and may be designated the time movement circuit controller.

Provision is made for transmitting to the central office a signal which may be termed a check signal, the purpose of which is to automatically test the line circuit from the sub-station to the central office and also to notify the central office at predetermined intervals that the clock mechanism or time movement 89 at the sub-station is in working order. For this purpose, a break wheel 140 is provided which is mounted on a shaft 142 (see Figs. 2 and 5) of a motor mechanism 143 provided with a detent disk 144 engaged by a detent on a lever 146 with which co-operates a second lever 147 which is actuated once an hour or at any other desired interval of time by a disk 148, having suitable means, shown in Fig. 1 as a stud or pin 149, by which the lever 147 is moved to release the detent lever 146 and permit the motor 143 to rotate the signal wheel 140.

The transmission of the check signal may be mechanically or electrically controlled, and in the diagrammatic view Fig. 1, I have represented both methods, the mechanical controller being represented as the disk 148 and lever 147, and the electrical control being represented by an electromagnet 162 and its armature 180 attached to the detent lever 146. The detent lever 146 is provided with a circuit controlling arm 150, which co-operates with a circuit terminal 151 and closes the circuit of the break wheel 140, and simultaneously releases the fan 152 of the motor 143, thereby permitting the latter to transmit to the central office a signal which may be termed the O. K. signal and which indicates that the system and especially the line wires 68, 69 are in working order. The circuit of the check or O. K. signal may be traced as follows—From the battery 84 by wire 83 to ground 82, thence by ground 160 in sub-station b, wire 161, electromagnet 162 and wire 163 to break wheel 140, thence by pen 164 and wire 165 to contact arm 150, thence by terminal 151 and wire 166 to contact piece 72, thence alternately over the line wires 68, 69 back to the battery 84 as above described with relation to the other signals.

The oscillation of the switch 72 is effected by the motor 143. The shaft 142 may be provided with a second break wheel 141, which may be used as a fire signal and is distinguishable from the O. K. signal and is controlled by a manually operated circuit controller located at each transmitting station for the watchman, and shown in Fig. 1 as a lever 170 connected by the twin wire 171 to the oscillating switch member 72 and co-operating with a terminal 172 joined by the wire 173 to wire 23, which is connected by wire 174 to a wire 175 leading to the pen 176 co-operating with the fire signal wheel 141. By closing the switch lever 170 the circuit of the magnet 162 is completed and the fire signal is transmitted over both sides of the main line to the central station. This circuit may be traced as follows. From the ground 160 by wire 161, magnet 162, wire 163, signal wheel 141, pen 176, wires 175, 174, 23, 173 to terminal 172, thence by lever 170, and twin wires 171 to oscillating switch 72 and line wires 68, 69, to central office, thence back to ground 160. It will be observed, that each time the O. K. signal is transmitted, the fire signal wheel 141 is revolved, thereby serving to keep the contact surfaces of said fire signal wheel and its co-operating pen 176, in good electrical condition. The fire signal is distinguishable from the check signal, so that when the fire signal is received it is distinguishable from the check signal which is received simultaneously therewith. When the check signal is transmitted in regular order, it alone is received at the central station, notwithstanding that the fire signal wheel 141 is simultaneously rotated, because the circuit of the fire signal wheel is open at the switch 170.

In the apparatus shown in Figs. 2, 3, 5, 8 and 9, the mechanical method of operating the check signal, is illustrated, and in this connection provision is made for automatically rendering the apparatus inoperative to transmit the check signal during a predetermined period of time, as for instance, between the hours of six a. m. and six p. m. For this purpose, the time movement 89 effects one complete rotation of a cam disk 185 (see Figs. 2 and 9) once in twenty-four hours. This cam disk has one half of its circumference reduced in diameter as at 186, and controls the operation of a lever 190, which for the period stated locks the escapement disk 191 of the motor 143 from being operated when the pins 149 on the disk 148 actuate the lever 147, thereby preventing the motor 143 from transmitting the check signal during the predetermined time stated. When the high part of the disk 185 engages the lever 190 the latter is rocked so as to remove its arm 195 (see Figs. 8 and 9) from the path of movement of the pin 196 on the disk 191, and thereby place the disk 191 and its motor 143 under control of the lever 147, which, as shown in Fig. 8, has an arm 197 co-operating with a pin 198 on the disk 191. The lever 147 has co-operating with it a lever 200 loose on the pivot 201 for the lever 147 and having its long arm 202 provided with pin 203 which engages a notch 204 in a disk 205 of the motor 143. The disk 205 may be termed the controller for the detent disk 191 of the motor 143. The arm 202 has fast to it a second arm 207, which co-operates with the pin 196 on the disk 191 and is arranged so that when the detent pin 203 is engaged with the notch 204 of the disk 205, the arm 207 is in the path of movement of the pin 196, being held there by the weight of the lever 200. The pin 203 is disengaged from the notch 204 at or about the time the hooked end of the arm 207 is removed from engagement with the pin 196. The movement is effected by the pin 149 moving the lever 147 which carries with it the lever 200. The upward movement of the lever 147 causes the arm 197 to be lowered into the path of the pin 198, so that the disk 191 when released by the arm 207 can turn until the pin 198 engages the arm 197 of the lever 147. This movement of the disk 191 does not transmit any signal, but is merely a positioning movement to place the disk 191 under control of the lever 147, so that when the pin 149 passes from under the lever 147 the latter then drops and moves the arm 197 upward and out of engagement with the pin 198, thereby permitting the motor 143 to rotate the signal wheels one complete revolution or until the pin 196 engages the hook on the arm 207. The motor 143 is permitted to be thus operated when the arm 190 is in engagement with the high part of the disk 185. When however the lever is engaged with the reduced portion 186, the hooked end of the lever arm 195 engages the pin 196 and prevents any movement of the motor 143 and thereby renders the action of the pin 149 on the lever 147 ineffective upon the said motor. In order to prevent a prolonged operation of any transmitter as for instance transmitter 1 energizing the trouble magnet 29 when the controlling arm 6 has advanced to transmitter 2, the said arm is provided with a tail piece or overlap 220, which opens the circuit of the trouble magnet 29 between the terminals 17, 15 of the transmitter 1, when the arm 6 is engaged with the terminals of transmitter 2.

From the above description, it will be observed that the magnets $g$ of the recording clock are controlled in their operation by a motor-operated circuit controller, namely the arm 6, and the motor is governed by an electromagnet which is under the control of the operator or watchman. The motor-operated circuit controller governs the operation of an electromagnet, which in turn controls the operation of a signal, which is transmitted to the central office in case the watchman operates the wrong transmitter. The motor which operates the circuit controlling arm also operates one member of a circuit controller, which co-operates with a second member driven by a clock or time movement, so that in case the clock stops while the watchman is performing his duty, a signal indicative of this fact is transmitted to the central office. The motor which operates the circuit controlling arm also operates one member of a second circuit controller, which co-operates with a second member operated in unison with the first member by a motor which is under control of the time or clock movement, whereby in case the watchman fails to perform his duty, a third signal is transmitted to the central office indicative of this fact. The time or clock movement automatically controls the operation of a fourth signal which is transmitted to the central office at predetermined intervals of time and indicates that the system is in working order. The absence or non-receipt of this signal indicates a fault in the system.

Claims.

1. In a signaling system of the class described, in combination, a central office, a sub-station, an electric circuit connecting said stations, a recording clock in said sub-station, a plurality of transmitting stations in said sub-station, a plurality of circuit terminals in circuit with said recording clock, a motor-operated circuit controller co-operating with said circuit terminals, a motor to move said circuit controller step by step, an electromagnet controlling the operation of said motor, a signal mechanism adapted to be connected in circuit with said central office, an electromagnet governing the operation of said signal mechanism, a circuit controller for the last mentioned electromagnet, an electromagnet governing the operation of the circuit controller for the signal circuit-operating magnet and adapted to be connected in circuit with a transmitting station by the motor-operated circuit controller, for the purpose specified.

2. In a signaling system of the class described, in combination, a central office, a sub-station, an electric circuit connecting said stations, a recording clock in said sub-station, a plurality of transmitting stations in said sub-station, a plurality of circuit terminals in circuit with said recording clock, a motor-operated circuit controller co-operating with said circuit terminals, a motor to move said circuit controller step by step, an electromagnet controlling the operation of said motor, a signal mechanism adapted to be connected in circuit with said central office, an electromagnet governing the operation of said signal mechanism, a circuit controller for the last mentioned electromagnet, an electromagnet governing the operation of the circuit controller for the signal circuit-operating magnet and adapted to be connected in circuit with a transmitting station by the motor-operated circuit controller, a time movement, a circuit controller movable thereby, a second motor-operated circuit controller co-operating with the circuit controller operated by the time movement, and a signal mechanism governed by the circuit controller operated by said time movement, for the purpose specified.

3. In a signaling system of the class described, in combination, a central office, a sub-station, an electric circuit connecting said stations, a recording clock in said sub-station, a plurality of transmitting stations in said sub-station, a plurality of circuit terminals in circuit with said recording clock, a motor-operated circuit controller co-operating with said circuit terminals, a motor to move said circuit controller step by step, an electromagnet controlling the operation of said motor, a signal mechanism adapted to be connected in circuit with said central office, an electromagnet governing the operation of said signal mechanism, a circuit controller for the last mentioned electromagnet, an electromagnet governing the operation of the circuit controller for the signal circuit-operating magnet and adapted to be connected in circuit with a transmitting station by the motor operated circuit controller, a time movement, a circuit controller movable thereby, a second motor-operated circuit controller co-operating with the circuit controller operated by the time movement, a signal mechanism governed by the circuit controller operated by said time movement, a third motor-operated circuit controller, an auxiliary motor, a circuit controller co-operating with said third motor-operated circuit controller and operated by said auxiliary motor, means operated by the time movement for releasing the auxiliary motor to permit it to move its circuit controller in unison with the third motor-operated circuit controller, and a signal mechanism governed by the third motor-operated circuit controller and the circuit controller operated by said auxiliary motor, substantially as described.

4. In a signaling system of the class described, in combination, a central station, a sub-station electrically connected with said central station and provided with a plurality of transmitting and receiving instruments, electric circuits in which said instruments are included, a motor-operated circuit controller governing the operation in sequence of said receiving instruments by said transmitting instruments, and a signal mechanism rendered effective to transmit to the central station a signal that the transmitting instruments are operated out of sequence, substantially as described.

5. In a signaling system of the class described, in combination, a central office, a sub-station electrically connected therewith and provided with a plurality of transmitting and receiving instruments, electric circuits in which said instruments are included, a motor-operated circuit controller governing the operation in sequence of said receiving instruments by said transmitting instruments, a second motor-operated circuit controller, a time movement, a circuit controller actuated by said time movement and co-operating with said second motor-operated circuit controller, and a signal mechanism governed by said time-operated circuit controller and said second motor-operated circuit controller to transmit to the central office a signal when the time movement stops, substantially as described.

6. In a signaling system of the class described, in combination, a central office, a substation electrically connected therewith and provided with a plurality of transmitting and receiving instruments, electric circuits in which said instruments are included, a motor-operated circuit controller governing the operation in sequence of said receiving instruments by said transmitting instruments, a second motor-operated circuit controller, a time movement, an auxiliary motor, a circuit controller operated by said auxiliary motor and co-operating with the second motor-operated circuit controller, means for holding the auxiliary motor and the circuit controller operated by it to prevent its movement until released, means operated by said time movement for releasing said holding means, and a signal mechanism governed by the second motor-operated circuit controller and the circuit controller operated by the auxiliary motor, to transmit a signal to the central office in case the second motor-operated circuit controller is not operated at the proper time to indicate failure of the operator to perform his duty, substantially as described.

7. In a signaling system of the class described, in combination, a transmitting device, circuit terminals connected therewith, a watchman's recording mechanism, an electromagnet to operate the same, circuit terminals connected with said electromagnet, a second electromagnet, circuit terminals connected with said second electromagnet, the circuit terminals of said transmitter normally engaging the circuit terminals of the second mentioned electromagnet to connect the second electromagnet in circuit with the transmitter, and means co-operating with said circuit terminals to disconnect the second electromagnet from said transmitter and connect the first mentioned electromagnet with said transmitter.

8. In a signaling system of the class described, in combination, a transmitting device, circuit terminals connected therewith, an electromagnet, circuit terminals connected with said electromagnet, a second electromagnet, circuit terminals connected with said second electromagnet, the circuit terminals of said transmitter normally engaging the circuit terminals of the second mentioned electromagnet to connect the second electromagnet in circuit with the transmitter, a movable arm co-operating with said circuit terminals, a motor to move it, contacts carried by said movable arm, an electromagnet controlling the operation of said motor and connected in circuit with said contacts, whereby the electromagnet controlling the movement of the said arm may be included in circuit with the transmitter and the first mentioned electromagnet, and the second mentioned electromagnet disconnected from said transmitter in one position of said arm, substantially as described.

9. In a signaling system, in combination, a central office, a sub-station electrically connected with said central station, a watchman's recording mechanism in said sub-station, including a plurality of transmitters and receivers, a signal mechanism, and means rendered effective by the operation of the transmitters out of sequence, for operating said signal mechanism to transmit to the central office a signal indicative of the fact that the wrong transmitter is operated, substantially as described.

10. In a signaling system, in combination, a central office, a sub-station electrically connected with said central office, a watchman's recording mechanism in said sub-station including a transmitter and a receiver, a time movement, a signal mechanism, and means rendered effective by the stopping of the time movement to transmit to the central office by said signal mechanism a signal indicative of the fact that the time movement has stopped and that the watchman is performing his duty, substantially as described.

11. In a signaling system, in combination, a central office, a sub-station electrically connected with said central office a watchman's recording mechanism in said sub-station including a transmitter and a receiver, a time movement, a signal mechanism including a break wheel, a motor to rotate said break wheel, and means rendered effective by the failure of the watchman to operate the transmitter, to release said motor and transmit to the central office by said break wheel a signal characterizing the fact that the watchman has failed to operate the transmitter, substantially as described.

12. In a signaling system, in combination, a central office, a sub-station electrically connected with said central office, a watchman's recording mechanism in said sub-station including a plurality of transmitters and receivers, circuit terminals for said transmitters, a circuit controller co-operating with said circuit terminals, means to move said circuit controller step by step, and means movable with said circuit controller for engaging some of the terminals of one transmitter while engaged with a circuit terminal of another transmitter, substantially as described.

13. In a signaling system, in combination, a rotatable circuit controller, a motor to rotate said circuit controller step by step, a second circuit controller operated by said motor, a time movement, a circuit controller operated by said time movement, an electromagnet controlled by the time-operated circuit controller and said second motor-operated circuit controller a signal mechanism including a break wheel, and a motor to rotate said break wheel and released by said electromagnet when the latter is energized by the closing of its circuit, substantially as described.

14. In a signaling system of the class described, in combination, a central office, a sub-station, an electric circuit connecting said stations, a continuous motor or time movement in said sub-station, a signal mechanism in said substation adapted to be connected in said electric circuit, a circuit controller governing said circuit, means operated by said time movement for effecting the operation of said circuit controller at predetermined intervals of time to effect the transmission of said signal to the central station, and means actuated by said time movement for rendering said signal mechanism inoperative for a predetermined length of time, substantially as described.

15. In a signaling system, in combination, a movable circuit controller, a motor to move it step by step, a second circuit controller operated by said motor, a time movement, an auxiliary motor, a circuit controller operated by said auxiliary motor, and means operated by said time movement to cause the auxiliary motor to move its circuit controller in unison with the second motor-operated circuit controller, substantially as described.

In testimony whereof, I have signed my name to this specification in the presence of two subscribing witnesses.

GEO. H. BOWEN.

Witnesses:
JAS. H. CHURCHILL,
J. MURPHY.